United States Patent
Mueller

(10) Patent No.: US 8,129,866 B2
(45) Date of Patent: Mar. 6, 2012

(54) MASS COUPLING AT CLOCKED HF-ELEMENTS

(75) Inventor: Christoph Mueller, Oppenau (DE)

(73) Assignee: Vega Grieshaber KG, Wolfach (DE)

( * ) Notice: Subject to any disclaimer, the term of this patent is extended or adjusted under 35 U.S.C. 154(b) by 1035 days.

(21) Appl. No.: 12/043,292

(22) Filed: Mar. 6, 2008

(65) Prior Publication Data

US 2008/0290926 A1    Nov. 27, 2008

Related U.S. Application Data

(60) Provisional application No. 60/939,647, filed on May 23, 2007.

(30) Foreign Application Priority Data

May 23, 2007 (DE) .......................... 10 2007 023 927

(51) Int. Cl.
*H02M 3/18* (2006.01)
(52) U.S. Cl. ........................................ 307/110; 307/129
(58) Field of Classification Search .................. 307/110, 307/129, 131; 327/376; 324/124; 73/290 R, 73/290 V
See application file for complete search history.

(56) References Cited

U.S. PATENT DOCUMENTS

| | | | |
|---|---|---|---|
| 5,369,409 A | 11/1994 | Urabe et al. | |
| 5,742,212 A * | 4/1998 | Kato et al. | 333/104 |
| 6,535,161 B1 * | 3/2003 | McEwan | 342/124 |
| 6,795,871 B2 | 9/2004 | Nolan et al. | |
| 6,915,438 B2 | 7/2005 | Boros | |
| 6,931,555 B2 | 8/2005 | Osborn | |
| 6,934,566 B2 | 8/2005 | Kang et al. | |
| 7,016,710 B2 | 3/2006 | Carmeli et al. | |
| 7,065,391 B2 | 6/2006 | Kanayama et al. | |
| 2004/0100394 A1 | 5/2004 | Hitt | |
| 2006/0000275 A1 | 1/2006 | Nilsson et al. | |

FOREIGN PATENT DOCUMENTS

EP    0667062    4/2001

* cited by examiner

*Primary Examiner* — Jared Fureman
*Assistant Examiner* — Carlos Amaya
(74) *Attorney, Agent, or Firm* — Fay Kaplun & Marcin, LLP

(57) ABSTRACT

A circuit for a fill-level measuring device is for the fast switching-on of a high-frequency element on a ground port is disclosed. The circuit comprises a switching unit with a circuit mass; a high-frequency element with a high-frequency mass; and a coupling element that couples the two masses together and at the same time insulates them from each other in a direct-current manner. In this way the switching unit can be arranged on the GND port of the HF-element, without influencing the HF characteristics of said HF element.

13 Claims, 5 Drawing Sheets

MASS COUPLING AT CLOCKED HF-ELEMENTS

PRIORITY CLAIM

This application claims the benefit of the filing date of DE Patent Application Serial No. 10 2007 023 927.2 filed on May 23, 2007 and U.S. Provisional Patent Application No. 60/939,647 filed on May 23, 2007, the disclosure of these applications is hereby incorporated herein by reference.

FILED OF INVENTION

The present invention relates to fill level measuring. In particular, the present invention relates to a circuit for a fill-level measuring device for the fast switching-on of a high-frequency element on a ground port; to a fill-level measuring device comprising such a circuit; to the use of such a circuit for fill level measuring; and to a method for the fast switching-on of a high-frequency element on a ground port for fill level measuring.

BACKGROUND INFORMATION

If high-frequency elements (HF-elements) are to be switched on temporarily, and if there is no suitable control connection, often the operating voltage is switched. Different variants of this are possible, as shown in FIG. 1. This involves direct switching of the operating voltage. Furthermore, indirect switching by way of a control input (a so-called shut-down) is also possible.

In the case of fast switching-on processes the switching unit comprises, for example, individual transistors that have correspondingly fast switching times. As a rule, relays or integrated switches are too slow for time-critical applications.

If the switching unit is located directly on the operating voltage of the HF-element, switching is either by way of relatively slow PNP transistors, or, where fast NPN transistors are used, an adequate control level must be ensured.

If the switching unit is located on the ground port, then in the case of HF-elements it is located in the so-called hot path, i.e. said switching unit is incorporated in the HF characteristics of the arrangement or of the HF-element.

SUMMARY OF INVENTION

The present invention relates to a circuit for a fill-level measuring device for the fast switching-on of a high-frequency element on a ground port; to a fill-level measuring device comprising such a circuit; to the use of such a circuit for fill level measuring; and to a method for the fast switching-on of a high-frequency element on a ground port for fill level measuring.

According to one embodiment of the present invention, a circuit for a fill-level measuring device for fast switching-on of a high-frequency element on a ground port is stated, with the circuit comprising a switching unit with a first ground port; a high-frequency element with a second ground port; a coupling element; and insulation between the second ground port and the first ground port. In this arrangement the switching unit is connected between the first ground port and the high-frequency element, wherein the second ground port is coupled by way of the coupling element to the first ground port.

In other words, the switching unit can be arranged at the GND port of the HF-element without influencing the high-frequency characteristics of said HF-element.

This fast switching-on makes it possible to use the circuit (i.e. the HF-elements) for pulse radar measuring or for the purpose of saving energy (in that the HF-elements are switched off when for energy reasons they are not to be used).

According to a further exemplary embodiment of the present invention, the coupling element and the insulation between the second ground port and the first ground port are designed such that any DC-current flow between the first ground port and the high-frequency element is prevented.

This DC-current flow is only made possible when the switching unit is switched so that a short circuit between the two ground ports is established.

Thus, in the region of the HF-element that is to be switched on, a new mass is introduced which is insulated from the circuit mass. It in turn is coupled, by way of the coupling element (for example in the form of a capacitor), to the circuit mass. When the HF-element is switched on, it is then only necessary to short circuit the two mass potentials in a direct-current manner (DC manner) for current to be able to flow.

According to a further exemplary embodiment of the present invention, the coupling element is a capacitor.

According to a further exemplary embodiment of the present invention, the circuit comprises a printed circuit board that comprises a first layer, a second layer, and a third layer, wherein the coupling element is designed as a plate capacitor that is formed by the second layer and the third layer.

According to a further exemplary embodiment of the present invention, the circuit comprises a printed circuit board that comprises a first layer, a second layer, and a third layer, wherein the plate capacitor is formed by the second layer and the first layer.

It should be noted that the coupling element can also be designed in some other way. It is merely important that said coupling element can prevent a direct-current flow between the circuit mass and the high-frequency mass when the switching unit is in the "open" position. For example it is possible to do entirely without the third layer, for example if the coupling element is integrated in the second layer.

According to a further exemplary embodiment of the present invention, the circuit also comprises a printed circuit board with three layers, wherein, however, the coupling element is designed as a coupling area in the third layer. The coupling element is thus not formed by the second and the third layer in the form of a plate capacitor.

Furthermore, according to a further exemplary embodiment of the present invention, the circuit can be designed as a micro-strip circuit, wherein the second ground port is designed as an area on the underside of the printed circuit board.

According to a further exemplary embodiment of the present invention, all three layers comprise the first ground port (circuit mass).

According to a further exemplary embodiment, the printed circuit board can be designed as a multilayer comprising many layers, in which multilayer mass couplings are established only in a sub-region, i.e. only in part of the many layers.

According to a further exemplary embodiment, coupling of the two masses can only take place between the first and the second layer.

According to a further exemplary embodiment of the present invention, the first layer comprises the high-frequency element, wherein the second layer comprises an insulated high-frequency mass area that represents the second ground port, and wherein the third layer comprises the coupling element.

According to a further exemplary embodiment of the present invention, the switching unit is designed as an element selected from the group comprising semiconductor components such as, for example, transistors or diodes, signal switches and relays.

According to a further exemplary embodiment of the present invention, the high-frequency element is designed as an element selected from the group comprising oscillators, transmitter amplifiers, low-noise amplifiers (LNA), variable gain amplifiers (VGA), mixers, and multipliers.

According to a further exemplary embodiment of the present invention, a fill-level measuring device is stated that comprises a circuit as described above.

According to a further exemplary embodiment of the present invention, the use of such a circuit for fill level measuring is stated.

According to a further exemplary embodiment of the present invention, a method for the fast switching-on of a high-frequency element on a ground port for fill level measuring is stated, in which method a first ground port is provided on a switching unit, a second ground port is provided on a high-frequency element, wherein the switching unit is connected between the first ground port and the high-frequency element, and in which insulation between the second ground port and the first ground port is provided. Furthermore, coupling of the second ground port to the first ground port takes place by way of a coupling element.

In a further method-related step the two ground ports are short-circuited to each other by way of a switching unit so that the high-frequency element is switched on.

It should be noted that the exemplary embodiments of the invention that have been described in the context of the circuit also comprise the method, the use, and the fill-level measuring device.

BRIEF DESCRIPTION OF DRAWINGS

Below, preferred exemplary embodiments of the present invention are described with reference to the figures.

Figure 1:
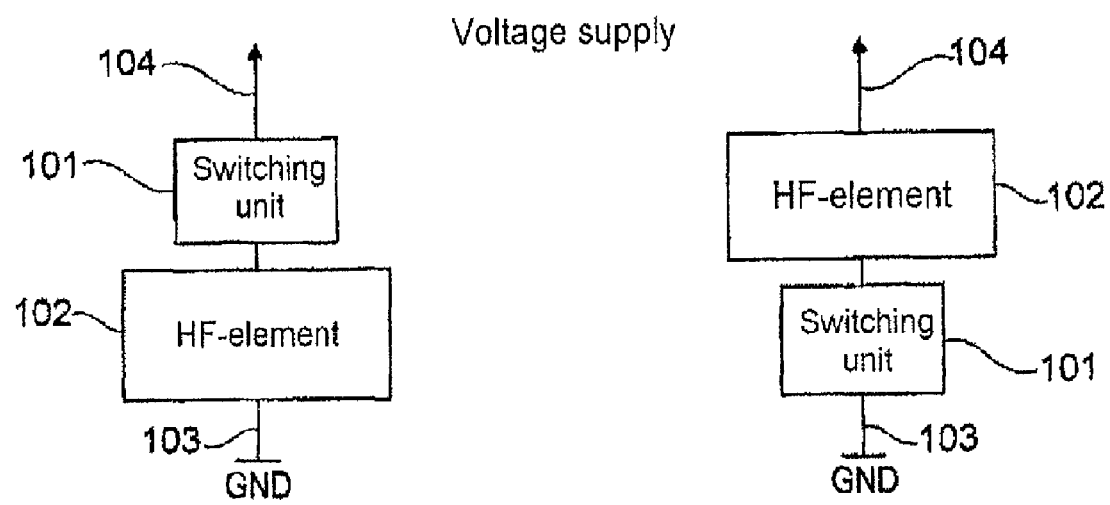
FIG. 1 shows a diagrammatic view of two arrangements of the switching unit and the HF-element according to the state of the art.

The illustrations in the figures are diagrammatic and not to scale.

DETAILED DESCRIPTION

In the following description of the figures the same reference characters are used for identical or similar elements.

FIG. 1 shows two circuits for switching HF-elements according to the state of the art. In the left-hand embodiment the HF-element 102 is connected to earth (ground port GND) 103 on one side.

On the other side the HF-element 102 is connected to a switching unit 101 that in turn establishes a connection to a voltage supply 104.

In the right-hand embodiment the switching unit 101 is located between the mass 103 and the HF-element 102, which on the other side is connected to the voltage supply 104.

In the left-hand example, switching is either by way of relatively slow PNP transistors, or, if fast NPN transistors are used, an adequate control level is ensured.

In the right-hand embodiment, in the case of HF-elements, the switching unit is in the so-called "hot path", i.e. said switching unit is incorporated in the HF-characteristics of the arrangement or of the HF-element.

Figure 2:
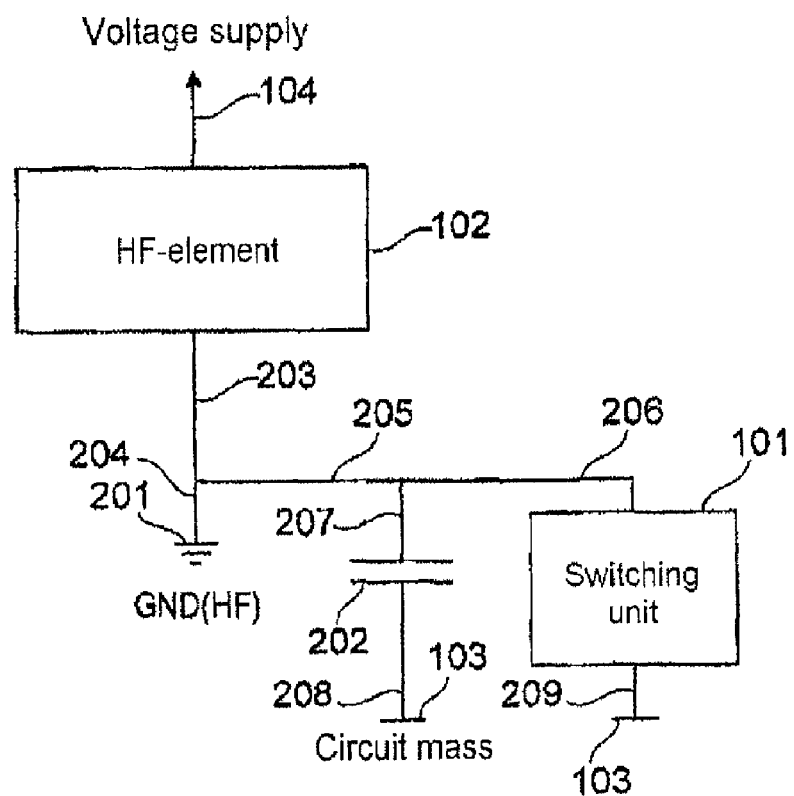
FIG. 2 shows a diagrammatic view of a circuit according to an exemplary embodiment of the present invention.

FIG. 2 shows a circuit according to an exemplary embodiment of the present invention. On one side the HF-element 102 is connected to a voltage supply 104, and on the other side (by way of a further connection) the HF-element 102 is connected to a high-frequency mass 201 by way of the lines 203, 204.

Figure 3:
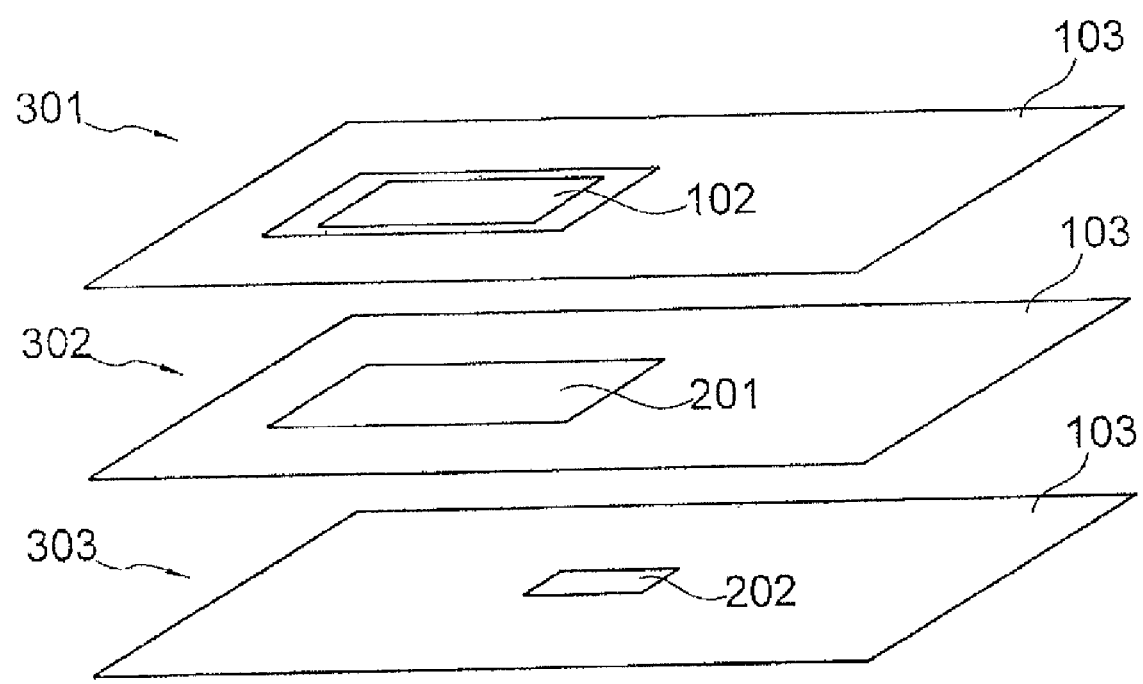
FIG. 3 shows a diagrammatic view of a layered design of a microwave print.

The high-frequency mass 201 is, for example, located in a printed circuit board in a second layer that is located between the first layer with the HF-element 102 and the third layer with the coupling element 202 (see FIG. 3).

The high-frequency mass 201 of the HF-element 102 is connected, by way of the lines 205, 207, to the coupling element 202, which in turn is connected, by way of the line 208, to the circuit mass 103.

Furthermore, the high-frequency mass 201 is connected, by way of the lines 205, 206, to the switching unit 101, which in turn is connected, by way of the line 209, to the circuit mass 103.

From the point of view of high frequency the two masses 201, 103 are identical. However, direct current can flow only if the two masses 201, 103 are short-circuited together by means of the switching unit.

In the case of micro-strip circuits the high-frequency mass 201 is, for example, designed as an area on the underside of the printed circuit board. The coupling element 202 (for example a capacitor between the two mass potentials 201, 103) can be implemented by targeted coupling in a further interior layer, which, if at all possible, is positioned very close to the HF mass layer.

FIG. 3 shows a diagrammatic view of a layered design of a microwave print according to an exemplary embodiment of the present invention. A first layer 301, a second layer 302, and a third layer 303 are provided. All three layers comprise the circuit mass 103. The first layer 301 comprises the high-frequency element 102 to be switched, if need be together with further micro-strip circuit elements (not shown in FIG. 3). The second layer 302 then comprises an insulated HF-mass area 201 that is associated with the HF-element 102 of the first layer 301. The third layer 303 comprises the coupling element 202 which, again insulated from the circuit mass 103, provides coupling between the circuit mass 103 and the HF-mass 201 of the HF-element 102. In principle, the printed circuit board results in plate capacitors between the coupling element 202 and the mass area 201 as well as the circuit mass 103.

The construction of the circuit mass areas 103, 201 in the three layers 301, 302, 303 is variable, i.e. it can also be designed in some other way. Likewise, the design of the coupling element in the third layer 303 is variable. Various embodiments can be implemented.

Coupling of the various masses can be implemented in various ways. For example, coupling can be designed in the described manner as a coupling area 202 in the third layer 303. Furthermore, the third layer 303 can also be designed in a sheet-like manner as a circuit mass, wherein coupling is then implemented by the plate capacitor that is created between the second layer 302 and the third layer 303.

For example, coupling can also be implemented by way of a plate capacitor that is created between the second layer 302 and the first layer 301. In such a case the third layer 303 would be without a function.

The switching unit 101 can also be designed in various ways. For example, the switching unit 101 can be designed as a transistor, diode, signal switch or relay. Moreover, the arrangement of the switch can be implemented in various ways because said switch is not arranged in the so-called "hot path".

Figure 4:
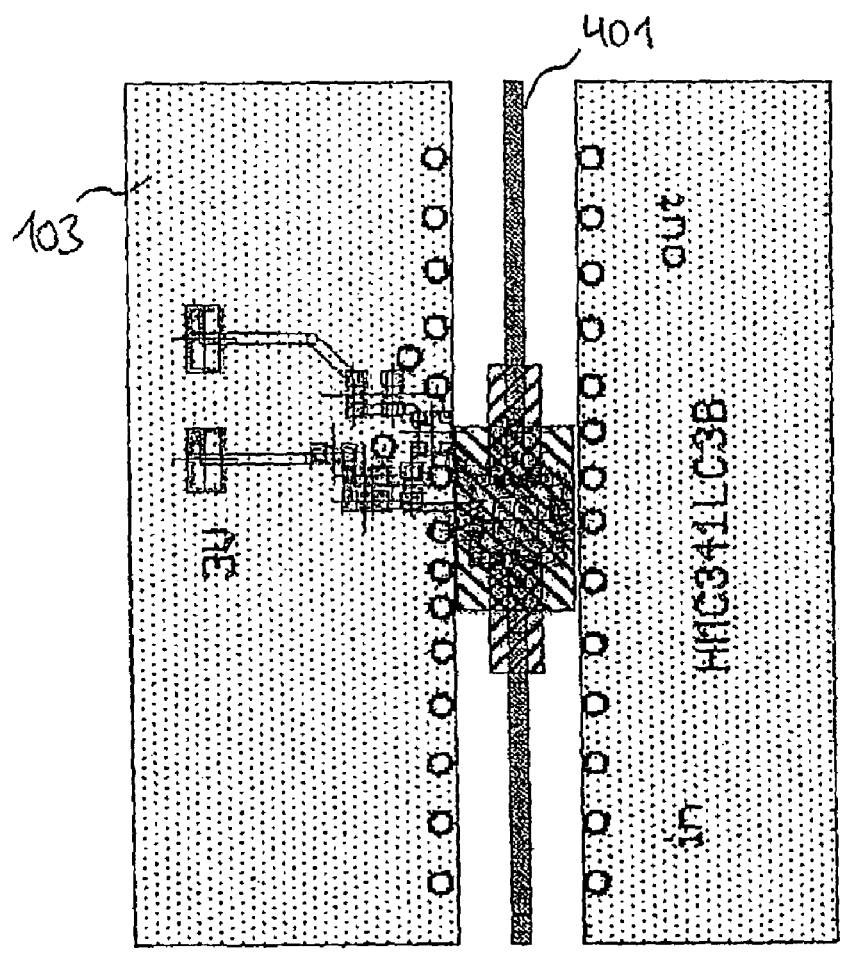
FIG. 4 shows a microwave print of all three layers of a microwave amplifier according to an exemplary embodiment of the present invention.

FIG. 4 shows a microwave print of all three layers 301, 302, 303 of a microwave amplifier according to an exemplary embodiment of the present invention. The microwave amplifier comprises a high-frequency layout (high-frequency element) 401, which is shown in the pattern defined by the colour field 705 of FIG. 7. Furthermore, the coupling element of the third layer is shown in the pattern defined by the colour field 703 of FIG. 7. The insulated mass area of the second layer is shown in the pattern defined by the colour field 704 of FIG. 7. The circuit mass is shown in the pattern defined by the colour field 702 of FIG. 7.

Figure 5:
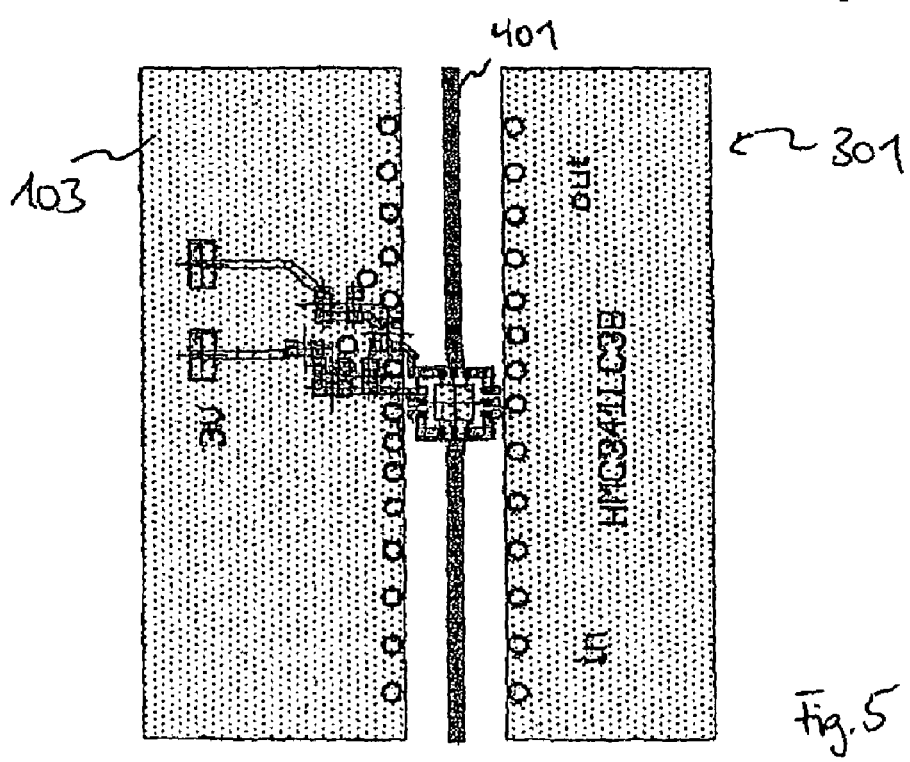
FIG. 5 shows a microwave print of the first layer 301 of FIG. 4.

FIG. 5 shows a microwave print of the first layer 301 of the microwave amplifier of FIG. 4 with the high-frequency layout (high-frequency element) 401.

Figure 6:
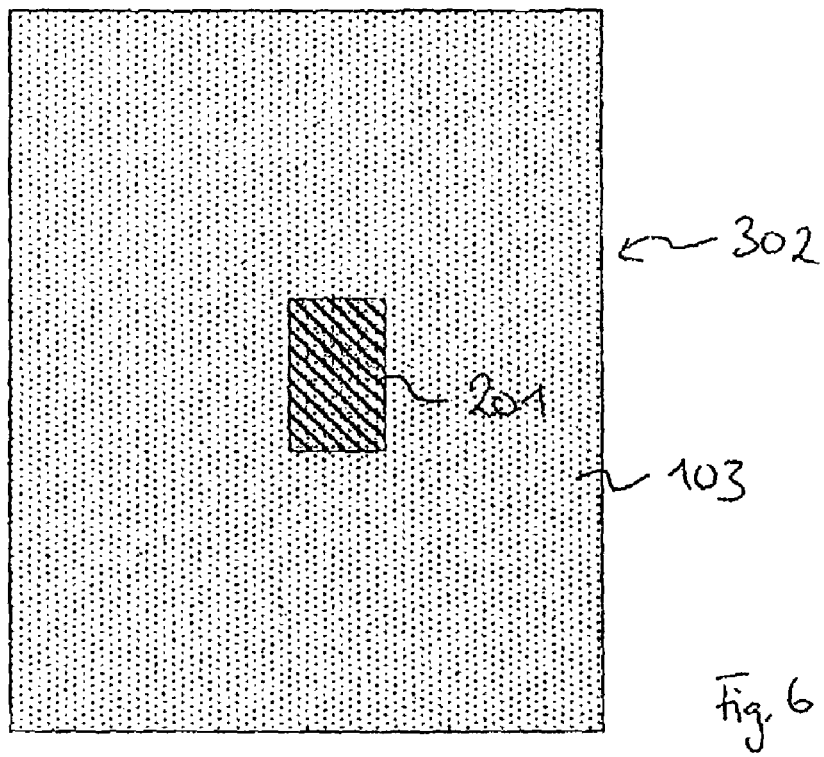
FIG. 6 shows a microwave print of the second layer 302 of FIG. 4.

FIG. 6 shows a microwave print of the second layer 302 of the microwave amplifier of FIG. 4. The second layer 302 comprises the insulated HF-mass area 201 that is associated with the HF-element 102 of the first layer 301.

Figure 7:
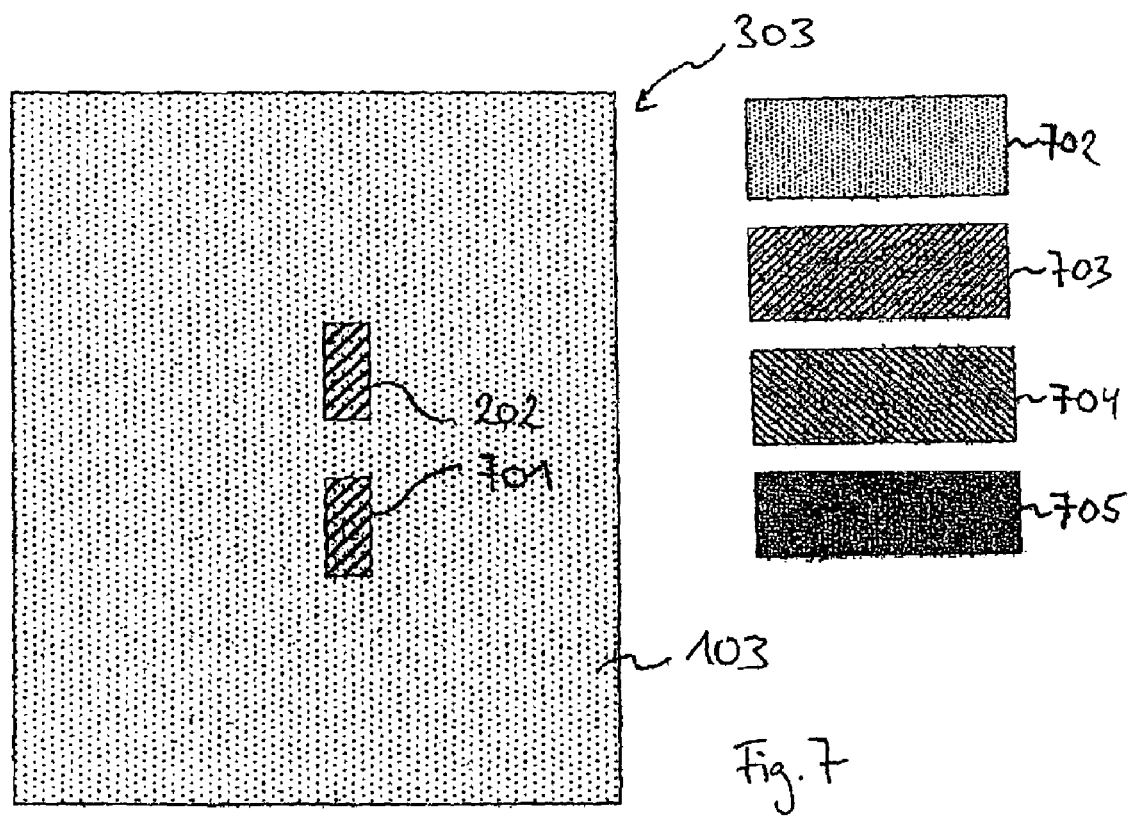
FIG. 7 shows a microwave print of the third layer 303 of FIG. 4.

FIG. 7 shows a microwave print of the third layer 303 of the microwave amplifier of FIG. 4. The third layer 303 comprises the coupling elements 202 and 701 that provide coupling between the circuit mass 103 and the HF-mass 201 of the HF-element 102.

Figure 8:
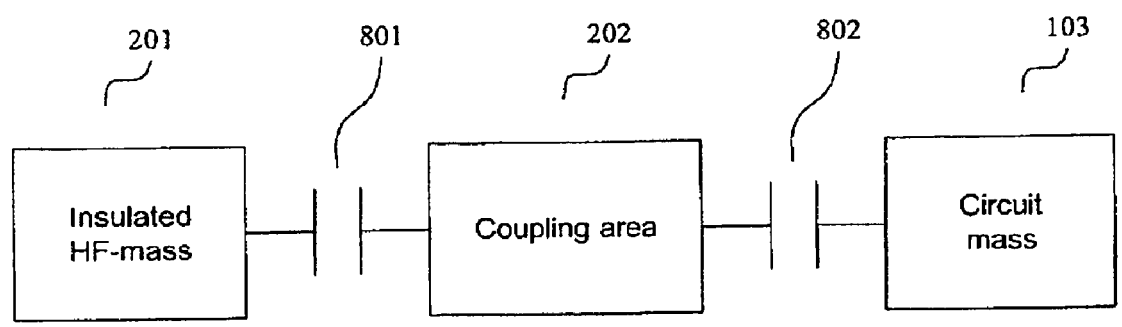
FIG. 8 shows a principle of the coupling arrangement according to an exemplary embodiment of the present invention.

FIG. 8 shows a principle of the coupling according to an exemplary embodiment of the present invention. The elements 801, 802, shown as capacitors, are representative of the plate capacitors that are created between the individual layers of the printed circuit board. The coupling area (coupling element) 202 itself can also be done without, in which case the insulated HF-mass 201 and the circuit mass 103 are only connected by a single plate capacitor.

The principle shown in the drawing relates not only to printed-circuit-board designs.

The invention relates in particular to the use of the circuit in fill-level measuring devices. The HF-elements to be switched are, for example, oscillators, transmitter amplifiers, LNAs, mixers, multipliers, or in general terms any active components of HF technology.

Figure 9:
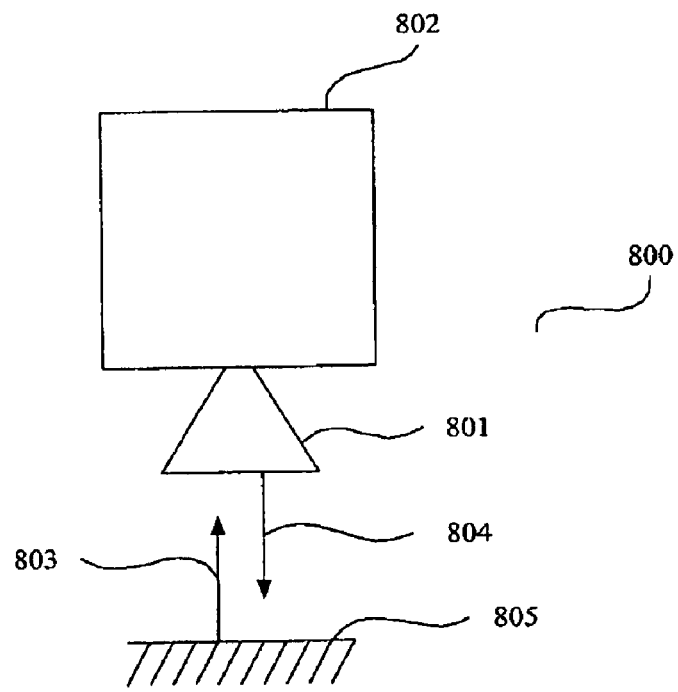
FIG. 9 shows a fill-level measuring device according to an exemplary embodiment of the present invention.

FIG. 9 shows a diagrammatic view of a fill-level measuring device in the form of a fill level radar according to an exemplary embodiment of the present invention. The fill level radar 800 comprises an antenna 801 and a housing 802. The housing 802 comprises the circuit described above.

The antenna 801 emits electromagnetic waves 804 that are reflected as a signal 803 by the surface of the feed material 805. The reflected signal 803 is subsequently acquired by the antenna 801 and is evaluated by the electronics contained in the housing.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A circuit for a fill-level measuring device for fast switching-on of a high-frequency ("HF") element on a ground port, comprising:
 a switching unit with a first ground port;
 a high-frequency element with a second ground port that is designed as a HF ground port;
 a coupling element; and
 an insulation between the first and second ground ports;
 wherein the switching unit is connected between the first ground port and the high-frequency element;
 wherein the second ground port is coupled, by way of the coupling element, to the first ground port,
 wherein the coupling of the second ground port to the first ground port is a high frequency coupling, and
 wherein a direct-current flow between the first ground port and the high-frequency element is only possible when the switching unit is switched so that a short circuit between the first ground port and the second ground port is established.

2. The circuit according to claim 1, wherein the coupling element and the insulation prevent a direct-current flow between the first ground port and the high-frequency element.

3. The circuit according to claim 1, wherein the coupling element is a capacitor.

4. The circuit according to claim 3, further comprising: a printed circuit board including a first layer, a second layer, and a third layer, wherein the coupling element is a plate capacitor that is formed by the second layer and the third layer.

5. The circuit according to claim 3, further comprising: a printed circuit board including a first layer, a second layer, and a third layer, wherein the coupling element is a coupling area in the third layer.

6. The circuit according to claim 1, wherein the circuit is a micro-strip circuit and wherein the second ground port is an area on an underside of the printed circuit board.

7. The circuit according to claim 5, wherein the first, second and third layers comprise the first ground port.

8. The circuit according to claim 4, wherein the first layer includes the high-frequency element, the second layer comprising an insulated high-frequency mass area that represents the second ground port, the third layer comprising the coupling element.

9. The circuit according to claim 5, wherein the first layer includes the high-frequency element, the second layer comprising an insulated high-frequency mass area that represents the second ground port, the third layer comprising the coupling element.

10. The circuit according to claim 1, wherein the switching unit is an element selected from a group comprising transistors, diodes, signal switches, and relays.

11. The circuit according to claim 1, wherein the high-frequency element is an element selected from a group comprising oscillators, transmitter amplifiers, low-noise amplifiers, mixers, and multipliers.

12. A fill-level measuring device, comprising:
 a circuit including
  (a) a switching unit with a first ground port;

(b) a high-frequency element with a second ground port that is designed as a HF ground port;
(c) a coupling element; and
(d) an insulation between the second ground port and the first ground port,
wherein the switching unit is connected between the first ground port and the high-frequency element;
wherein the second ground port is coupled, by way of the coupling element, to the first ground port,
wherein the coupling of the second ground port to the first ground port is a high frequency coupling, and
wherein a direct-current flow between the first ground port and the high-frequency element is only possible when the switching unit is switched so that a short circuit between the first ground port and the second ground port is established.

13. The use of a circuit for fill level measuring, the circuit including (a) a switching unit with a first ground port; (b) a high-frequency element with a second ground port that is designed as a HF ground port; (c) a coupling element; and (d) an insulation between the second ground port and the first ground port, wherein the switching unit is connected between the first ground port and the high-frequency element; and wherein the second ground port is coupled, by way of the coupling element, to the first ground port, wherein the coupling of the second ground port to the first ground port is a high frequency coupling, and wherein a direct-current flow between the first ground port and the high-frequency element is only possible when the switching unit is switched so that a short circuit between the first ground port and the second ground port is established.

* * * * *